United States Patent [19]

McMaster

[11] Patent Number: 4,784,681
[45] Date of Patent: Nov. 15, 1988

[54] COMBINED GLASS SHEET BENDING AND QUENCH STATION

[75] Inventor: Harold A. McMaster, Woodville, Ohio

[73] Assignee: Glasstech International L.P., Scarsdale, N.Y.

[21] Appl. No.: 153,246

[22] Filed: Feb. 8, 1988

[51] Int. Cl.⁴ ............ C03B 23/023; C03B 27/00
[52] U.S. Cl. ............................ 65/273; 65/104; 65/106; 65/287; 65/289
[58] Field of Search ............ 65/106, 273, 287, 289, 65/104

[56] References Cited

U.S. PATENT DOCUMENTS

| | | | |
|---|---|---|---|
| 2,223,124 | 11/1940 | Owen | 65/273 X |
| 3,256,080 | 6/1966 | Vranken | 65/104 |
| 3,573,022 | 3/1971 | Frank | 65/104 |
| 3,573,889 | 4/1971 | McMaster et al. | 65/104 X |
| 3,992,181 | 11/1976 | Frank | 65/104 |
| 4,123,246 | 10/1978 | Johnson | 65/104 |
| 4,386,952 | 6/1983 | Nitschke | 65/104 X |
| 4,619,683 | 10/1986 | Halberschmidt et al. | 65/104 X |

Primary Examiner—Arthur Kellogg
Attorney, Agent, or Firm—Brooks & Kushman

[57] ABSTRACT

A combined bending and quench station (30) disclosed comprises a roller conveyor (36) proximate a glass heating furnace (32). The roller conveyor (36) includes elongated rolls (38) spaced from each other in a parallel relationship. A plurality of molds (40) are located generally between the rolls (38). Each mold (40) has a glass engagement surface (42). An actuator (48) engages the glass engagement surfaces (42) with the heated glass sheet (34) to provide bending. Upper and lower blastheads (44,46) supply quenching gas that impinges with the bent glass sheet (34) while engaged with the molds (40) to fix the shape and provide tempering of the bent glass sheet.

25 Claims, 7 Drawing Sheets

COMBINED GLASS SHEET BENDING AND QUENCH STATION

TECHNICAL FIELD

This invention relates to a combined bending and quench station which has particular utility for bending and quenching heated flat glass sheets.

BACKGROUND ART

A sheet of glass can be bent for a particular application then quenched to both increase its mechanical strength and improve its breakage characteristics.

In many conventional flat glass bending and tempering operations, a sheet of glass to be bent and tempered is heated in a glass heating furnace to its deformation point of about 1200° F. to 1300° F. The glass sheet is then removed from the furnace along a roller conveyor having conveyor rolls to a bending station for bending of the heated glass sheet to the desired shape. After the glass is bent at the bending station, the bent glass sheet while still soft is conveyed along the roller conveyor to a quenching station, and some change of shape is bound to occur.

At the quenching station cooling gas is rapidly applied to the now bent heated flat glass sheet. Rapid cooling sets up high compressive forces near the surfaces of the glass sheet which give it desired strength and breakage characteristics.

It is important that the quenching step takes place soon after the glass sheet leaves the furnace. Premature cooling has been known to take place before the bending station adversely affecting the bending and tempering character of the glass sheet.

U.S. Pat. Nos. 4,092,141 to Frank et al and 3,846,104 to Seymour disclose methods and apparatus for handling glass sheets for shaping and cooling. Hot glass sheets are lifted into engagement with a vacuum shaping mold and held there by vacuum as the lifting mechanism retracts. A tempering ring is brought into position and the glass is released to deposit the bent glass sheet on the ring for movement to a cooling station. This method requires complicated equipment including a vacuum source and also requires separate bending and quenching stations.

U.S. Pat. No. 2,223,124 to Owen discloses a method of bending and case hardening a glass sheet on a roller runway. Rolls on the roller runway sag to bend the glass sheet thereon and blasts of air are applied to the bent glass sheet. The glass sheet remains in contact with the roller runway throughout the bending and case hardening and is subjected to the heat retained in the rollers from repetitive operation of the apparatus.

DISCLOSURE OF INVENTION

An object of the present invention is to provide a combined bending and quenching station for bending and quenching a heated flat glass sheet heated in a glass heating furnace. The station is economical to build as it has few or no moving parts and combines bending and quenching at one location.

In carrying out the above object, the combined bending and quench station comprises a roller conveyor proximate the glass heating furnace. The roller conveyor includes elongated rolls spaced from each other in a parallel relationship and rotatably supported to receive a heated flat glass sheet to be bent. A plurality of molds are located generally between the rolls. Each mold has a glass engagement surface for engaging the heated glass sheet to provide bending above the conveyor. A means engages the glass engagement surfaces of the molds with the hot glass sheet. Upper and lower blastheads supply quenching gas that impinges with the bent glass sheet while engaged with the molds to provide hardening, fix the shape and initiate tempering of the bent glass sheet.

In a first embodiment of the invention, the molds define movable molds that are vertically movable intermediate the conveyor rolls between raised and lowered positions. In the lowered position of the molds, the glass sheet can be conveyed on the rolls in a direction of conveyance. In the raised position of the molds, the heated glass sheet can be bent about a bending axis. After bending, the molds are lowered to place the glass sheet back on the roller conveyor.

In one arrangement of the first embodiment of the invention, the molds have arcuate glass engagement surfaces for bending the heated flat glass sheet with the bending axis substantially parallel to the direction of conveyance. These arcuate glass engagement surfaces can also be positioned to define a curve longitudinally along the direction of conveyance for complex bending of the heated flat glass sheet. In yet another arrangement, the molds have planar glass engagement surfaces that define a curve extending longitudinally along the direction of conveyance for bending of the heated flat glass sheet with the bending axis substantially perpendicular to the direction of conveyance. In these three arrangements, the means includes an actuator being operable to move the molds to the raised position above the roller conveyor where the heated flat glass sheet is sag bent to the shape defined by the glass engagement surfaces of the molds. The actuator is also operable for returning the molds to the lowered position.

In a second embodiment of the invention, the first embodiment constructed according to the present invention further includes a plurality of spaced upper molds fixedly mounted above the roller conveyor. The upper molds have glass engagement surfaces which accordingly correspond to either the arcuate or planar shape of the glass engagement surfaces of the movable molds. The upper molds are aligned with the movable molds for cooperative operation to press bend the heated flat glass sheet against the upper molds in the raised position of the movable molds.

In a third embodiment of the invention, the molds define fixed molds that are vertically fixed above the roller conveyor. In one arrangement, the fixed molds have arcuate glass engagement surfaces for bending the heated glass sheet about a bending axis extending substantially perpendicular to the rolls of the roller conveyor. These arcuate glass engagement surfaces can also be positioned to define a curve longitudinally along the direction of conveyance for complex bending of the heated flat glass sheet. In yet another arrangement of the embodiment, the molds have planar glass engagement surfaces that define a curve longitudinally along a direction of conveyance along the roller conveyor for bending the heated glass sheet about a bending axis extending substantially perpendicular to the direction of conveyance. In these three arrangements, the glass is engaged with the glass engagement surfaces of the molds by a control that sequentially regulates the air flow to the blastheads whereby the lower blastheads blow the heated flat glass sheet against the glass engagement surfaces of the molds to bend the glass sheet, and both upper and lower blastheads subsequently supply the quenching gas.

The objects, features, and advantages of the present invention are readily apparent from the following detailed description of the best mode for carrying out the invention when taken in connection with the accompanying drawings.

BEST MODE FOR CARRYING OUT THE INVENTION

With reference to the drawings, a combined bending and quench station constructed in accordance with the present invention is generally indicated by reference numeral 30 and is used for bending and quenching heated flat glass sheets that have been heated to their deformation point in a glass heating furnace 32. As is hereinafter more fully described, the bending and quench station 30 is positioned proximate the glass heating furnace 32 and provides bending of a heated flat glass sheet 34 above a roller conveyor 36 that receives the heated glass sheet. By bending glass sheet 34 above rolls 38 of roller conveyor 36, thermal contact with the conveyor rolls is temporarily eliminated so that the glass sheet can undergo bending and quenching under more balanced thermal conditions.

Figure 1:
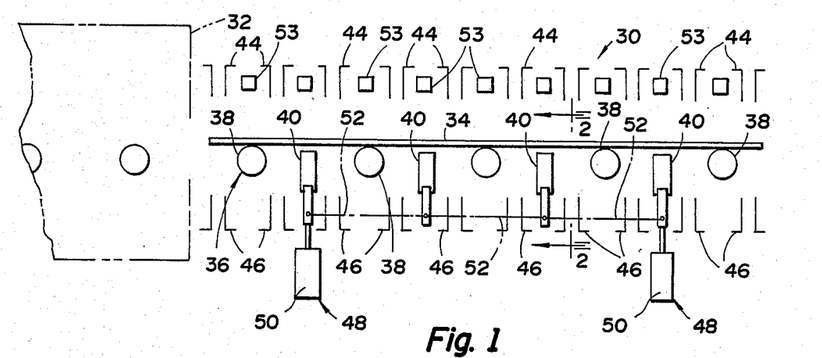
FIG. 1 is an elevational view of a roller conveyor in a combined bending and quench station constructed in accordance with the present invention defining a first embodiment of the invention and showing a plurality of movable molds in a lowered position.
Figure 2:
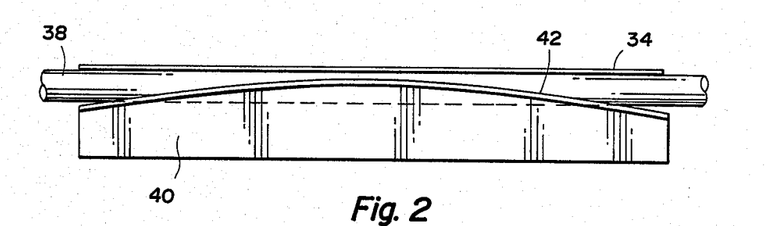
FIG. 2 is a partial sectional view taken along the direction of lines 2—2 in FIG. 1 showing a roller conveyor roll and a mold having an arcuate glass engagement surface.
Figure 3:
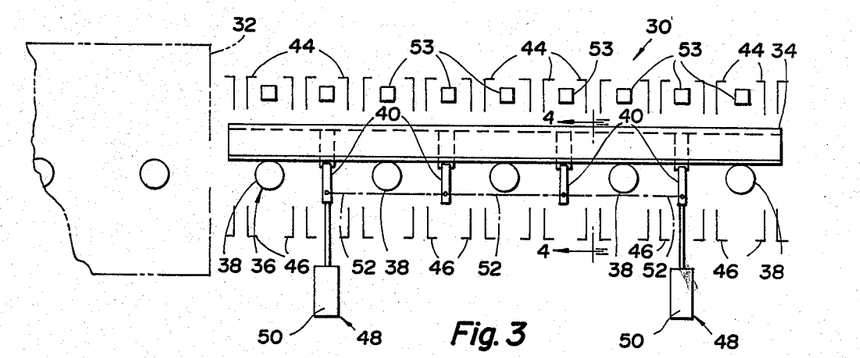
FIG. 3 is another elevation view of the combined bending and quench station shown in FIG. 1 illustrating the molds in a raised position.
Figure 4:
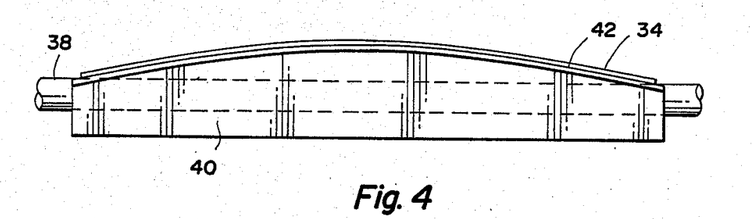
FIG. 4 is a partial sectional view taken along the direction of lines 4—4 in FIG. 3 showing the arcuate glass engagement surface of the mold in the raised position.

As shown in FIG. 1 of the drawings, the combined bending and quench station 30 comprises a roller conveyor 36 including elongated rolls 38 spaced from each other in a parallel relationship and rotatably supported to receive and convey a heated flat glass sheet 34 to be bent. A plurality of molds 40 are located generally between the rolls 38. Each mold 40 has a glass engagement surface 42 for engaging the heated glass sheet 34 to provide bending of the glass sheet above the conveyor 36. A means is provided for engaging the glass engagement surfaces 42 of the molds 40 with the heated glass sheet 34 to provide the bending. Upper and lower blastheads 44,46 supply quenching gas that impinges with the bent glass sheet 34 while engaged with the molds 40 to provide hardening, fix the shape and initiate tempering of the bent glass sheet.

FIGS. 1 through 10 illustrate a first embodiment of the invention wherein molds 40 are vertically movable intermediate the conveyor rolls 38 between raised and lowered positions. In the lowered position of the molds 40 shown in FIGS. 1, 2, 5, 8 and 9, the glass sheet 34 can be conveyed on the conveyor rolls 38 in a direction of conveyance a from the glass heating furnace 32 into position for bending and quenching and subsequently to further processing areas beyond the bending and quench station 30. In the raised position of the molds 40, shown in FIGS. 3, 4, 6, 7 and 10, the heated glass sheet 34 undergoes sag bending to bend the heated glass sheet 34 above the conveyor rolls 38. Then, while still suspended, the glass sheet 34 is quenched to impart the required mechanical characteristics to the bent glass sheet. After bending, the molds 40 are lowered to place the glass sheet 34 back on the roller conveyor 36.

Figure 5:
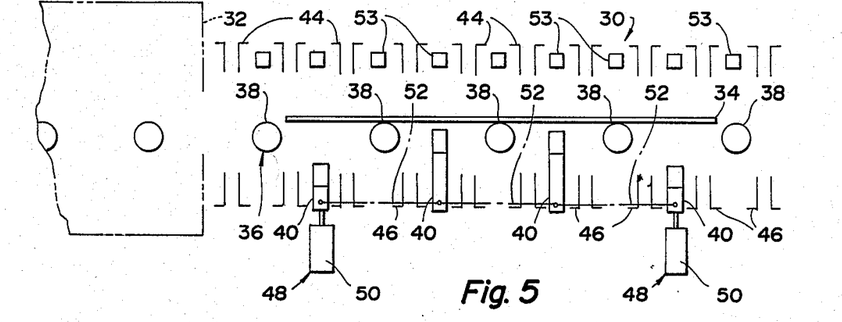
FIG. 5 is an elevational view of the roller conveyor shown in FIG. 1 having molds whose arcuate glass engagement surfaces define a curve along the roller conveyor.
Figure 6:
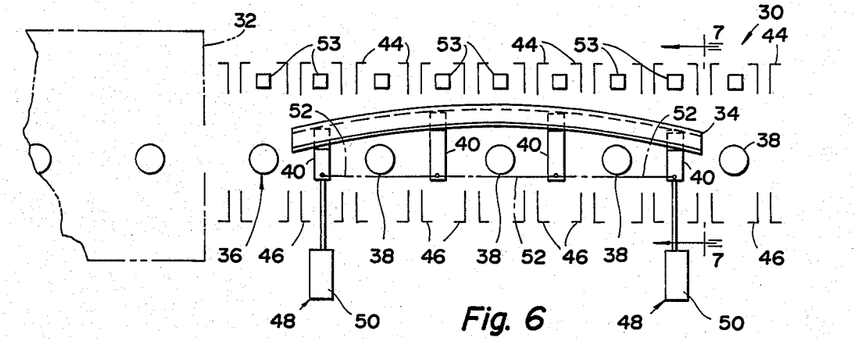
FIG. 6 is another elevational view of the roller conveyor shown in FIG. 5 illustrating the molds in the raised position.
Figure 7:
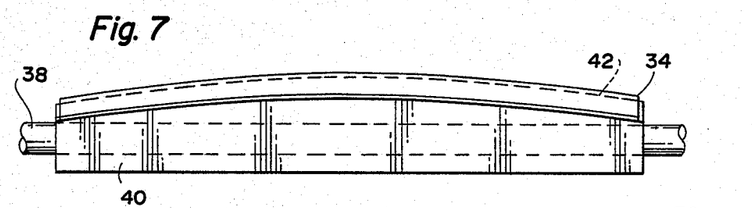
FIG. 7 is a partial sectional view taken along the direction of lines 7—7 in FIG. 6 showing a roller conveyor roll and the mold having an arcuate glass engagement surface.
Figure 8:
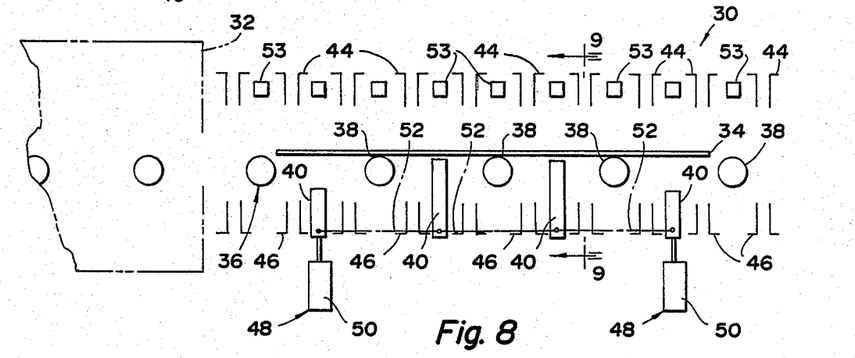
FIG. 8 is an elevational view of the roller conveyor shown in FIG. 1 having molds with planar glass engagement surfaces positioned to define a curve along the roller conveyor.
Figure 9:
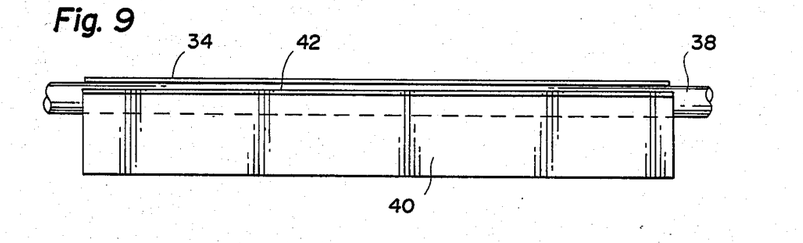
FIG. 9 is a partial sectional view taken along the direction of lines 9—9 in FIG. 8 showing the mold having a planar glass engagement surface in the lowered position.
Figure 10:
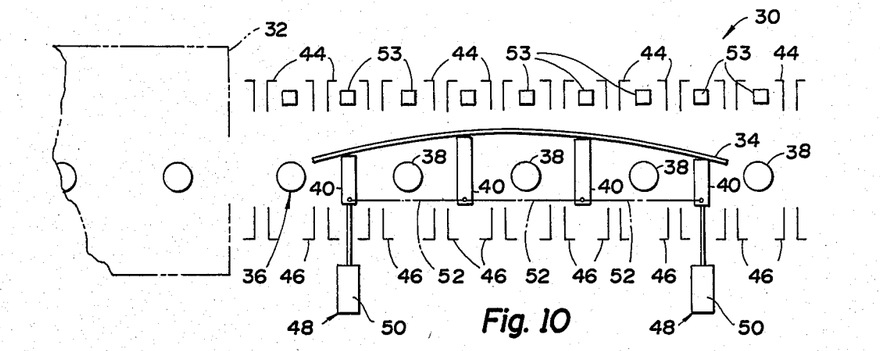
FIG. 10 is another elevational view of the roller conveyor shown in FIG. 8 illustrating the molds in the raised position.
Figure 11:
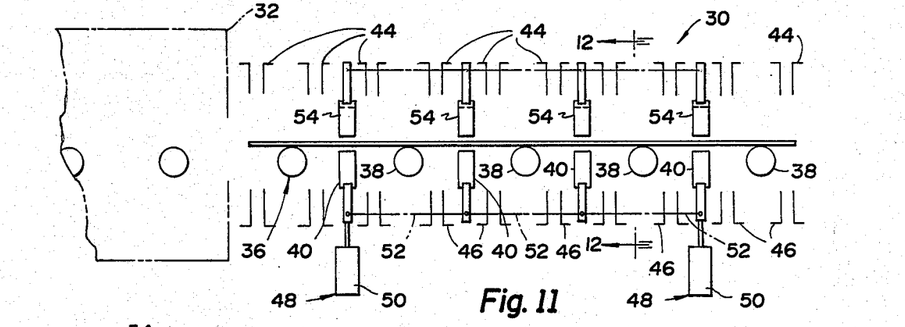
FIG. 11 is an elevational view of a roller conveyor constructed in accordance with the present invention defining a second embodiment of the invention further including a plurality of spaced upper molds fixedly mounted above the roller conveyor and aligned with the movable molds, shown in the lowered position.

FIGS. 1 through 4 illustrate one arrangement of the first embodiment of the station 30. In it, the molds 40 have arcuate glass engagement surfaces 42 for bending the heated flat glass sheet 34 about a bending axis b extending substantially parallel to the direction of conveyance a. These arcuate glass engagement surfaces 42 can also be positioned to define a curve longitudinally along the direction of conveyance a as illustrated in FIGS. 5, 6 and 7. The combination of the arcuate glass engagement surfaces 42 and the curve defining positioning along the roller conveyor 36 provide that the heated glass sheet 34 can be bent in a complex fashion. In yet another arrangement, shown in FIGS. 8 through 10, the molds 40 have planar glass engagement surfaces 42 positioned to define a curve longitudinally along the direction of conveyance a for bending the heated flat glass sheet 34 with the bending axis b extending substantially perpendicular to the direction of conveyance a.

In these three arrangements, an actuator 48 is operable to move the molds 40 to the raised position above the roller conveyor 36 to sag bend the heated flat glass sheet 34 to the shape defined by the glass engagement surfaces 42 of the molds 40. The actuator 48 is also operable for returning the molds 40 to the lowered position. The actuator 48 can be a manually or automatically operated actuator. Mechanical, hydraulic or pneumatic actuators are suitable for raising and lowering the molds 40. Preferably, the actuator 48 is at least one hydraulic cylinder 50 connected by linkages 52 to the molds 40.

FIGS. 1, 3, 5, 6, 8 and 10 illustrate heaters 53 mounted above the roller conveyor 36. Heaters 53 are operable to add heat to the glass sheet 34 to thereby facilitate the sag bending of the heated glass sheet.

In operation, the glass sheet 34 exits the glass heating furnace 32 along roller conveyor 36 and molds 40 are in the lowered position. When the glass sheet 34 is positioned on the rolls 38 above the molds 40, the actuator 48 is operated to raise the molds 40 and corresponding glass engagement surfaces 42 to lift the heated flat glass sheet 34 off of rolls 38 whereby the heated glass sheet is sag bent and forms to the shape defined by the glass engagement surfaces of the molds. In this raised position, the bent glass sheet 34 is rapidly quenched by quenching gas supplied by the upper and lower blastheads 44, 46 to impart the desired mechanical and breakage characteristics in the finished glass product. As soon as the glass sheet 34 is rigid, actuator 48 is operated to lower the molds 40 and the glass sheet is returned to conveyor rolls 38 to continue quenching and for subsequent processing and/or shipping.

Figure 12:
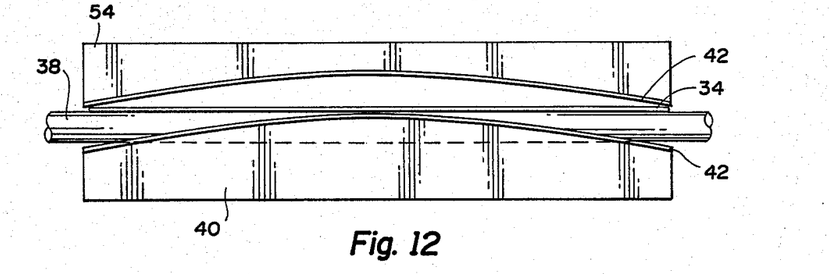
FIG. 12 is a partial sectional view taken along the direction of lines 12—12 in FIG. 11 illustrating the arcuate glass engagement surfaces of both movable and upper molds.
Figure 13:
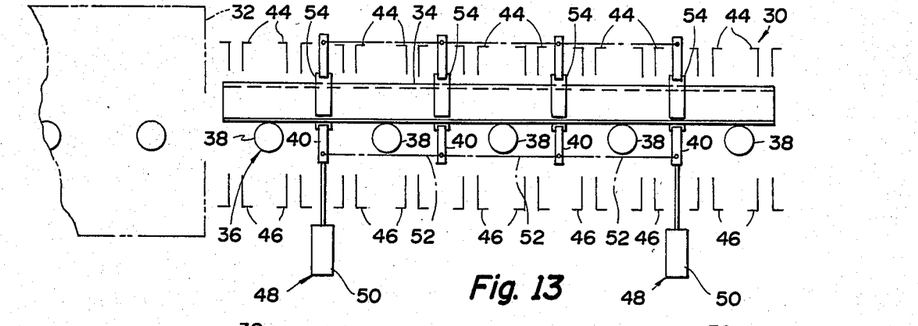
FIG. 13 is another elevational view of the roller conveyor shown in FIG. 11 illustrating the movable molds in the raised position.
Figure 14:
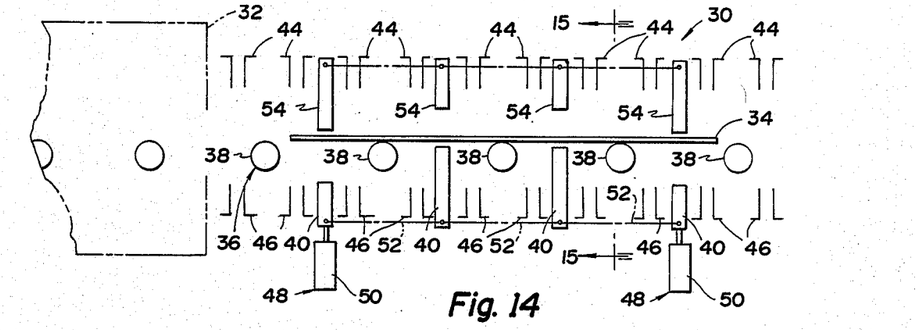
FIG. 14 is an elevational view of the roller conveyor shown in FIG. 13 illustrating the arcuate glass engagement surfaces positioned to define a curve along the roller conveyor.
Figure 15:
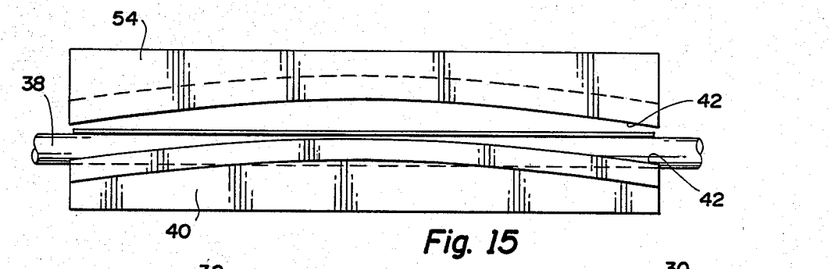
FIG. 15 is a partial sectional view taken along the direction of lines 15—15 in FIG. 14 showing the movable mold in cooperative alignment with the fixed mold in the lowered position of the movable mold.
Figure 16:
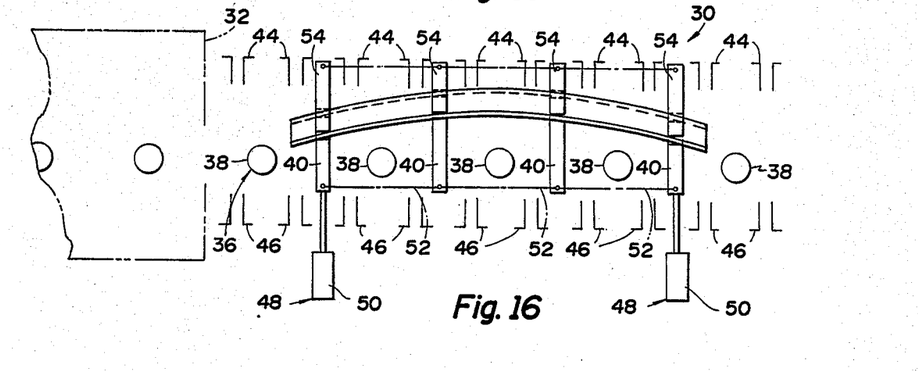
FIG. 16 is an elevational view of the roller conveyor shown in FIG. 14 illustrating the movable molds in the raised position.
Figure 17:
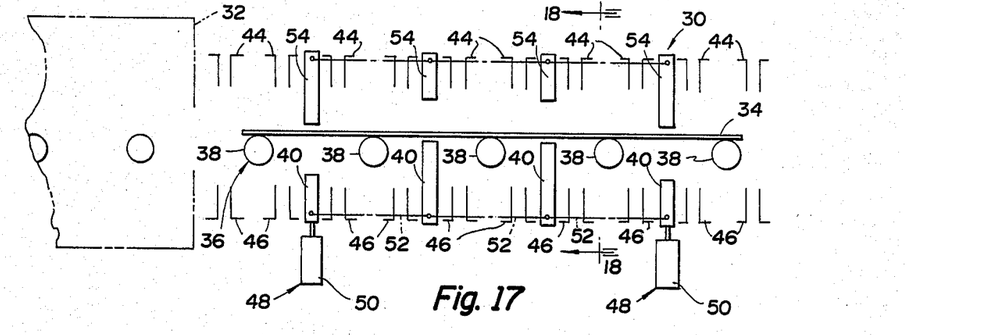
FIG. 17 is an elevational view of the roller conveyor shown in FIG. 11 having molds with planar glass engagement surfaces illustrating the movable molds in the lowered position.
Figure 18:
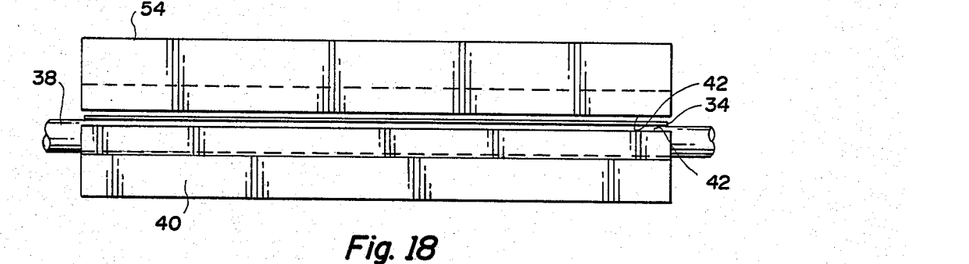
FIG. 18 is a partial sectional view taken along the direction of lines 18—18 in FIG. 17 showing the molds having planar glass engagement surfaces.
Figure 19:
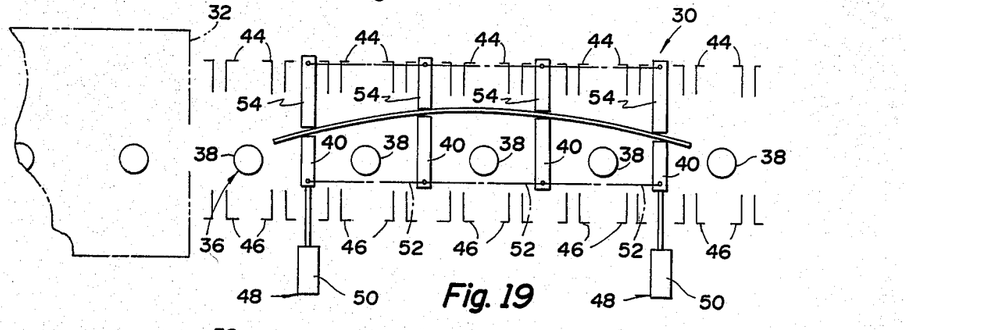
FIG. 19 is another elevational view of the roller conveyor shown in FIG. 17 illustrating the movable molds in the raised position.
Figure 20:
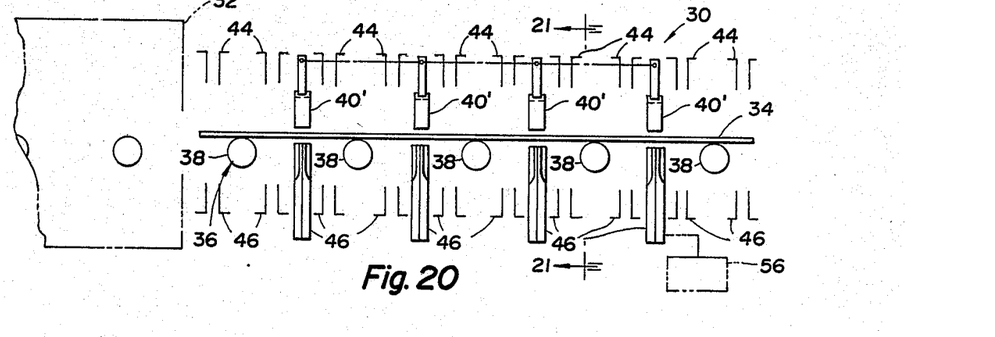
FIG. 20 is an elevational view of a roller conveyor for a bending and quench station constructed in accordance with the present invention defining a third embodiment shown having molds fixedly mounted above the roller conveyor.
Figure 21:
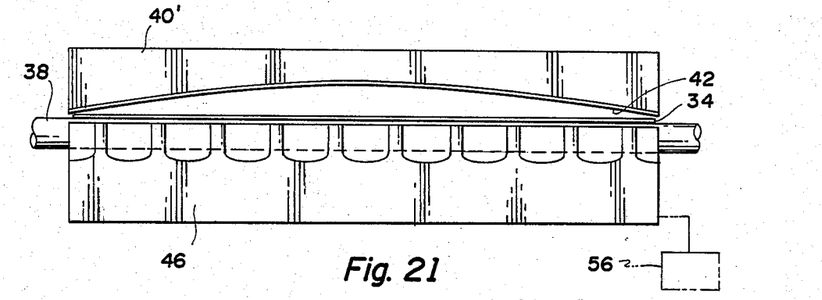
FIG. 21 is a partial sectional view taken along the direction of lines 21—21 in FIG. 20 illustrating, the molds having an arcuate glass engagement surface, and a lower blasthead.
Figure 22:
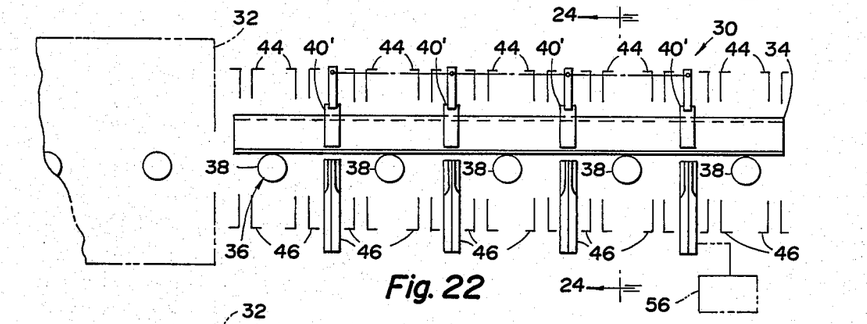
FIG. 22 is another elevational view of the bending and quench station shown in FIG. 20 illustrating a glass sheet being blown by air discharged from the lower blastheads, against the fixed molds.

FIGS. 11 through 19 illustrate a second embodiment of the invention which includes all the features of the first embodiment less heaters 53 and further includes a plurality of spaced upper molds 54 fixedly mounted above the roller conveyor 36. As shown in FIGS. 12, 15, and 18, the upper molds 54 have glass engagement surfaces 42 which accordingly complement either the arcuate or planar shape of the glass engagement surfaces of the movable molds 40. The upper molds 54 are also aligned with the movable molds 40 for cooperative operation to press bend the heated flat glass sheet 34 against the upper molds in the raised position of the movable molds, best seen in FIGS. 13, 16 and 19.

With reference to the operation of the first embodiment of the invention, the actuator 48 is operable to raise the movable molds 40 whereby in the raised position, the heated glass sheet 34 is press bent between the glass engagement surfaces 42 of the movable molds 40 and upper molds 54. Glass sheet 34 is bent and forms to the shape defined by the glass engagement surfaces 42. Then the bent glass sheet 34 is rapidly quenched by the upper and lower blastheads 44,46 to temper the glass sheet and returned to the roller conveyor 36.

Figure 23:
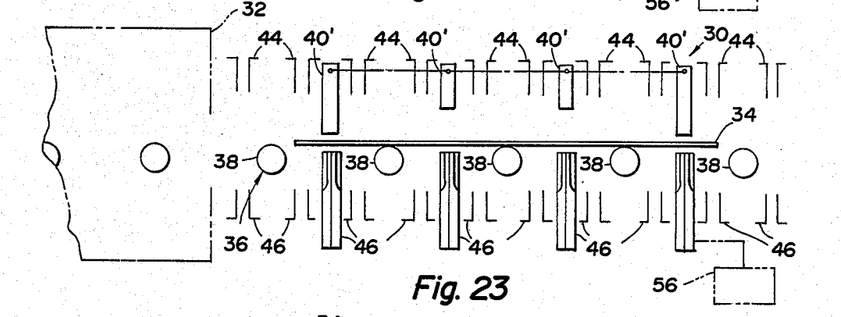
FIG. 23 is another elevational view of the bending and quench station shown in FIG. 20 illustrating the glass engagement surfaces of the molds being positioned to define a curve along the roller conveyor.
Figure 24:
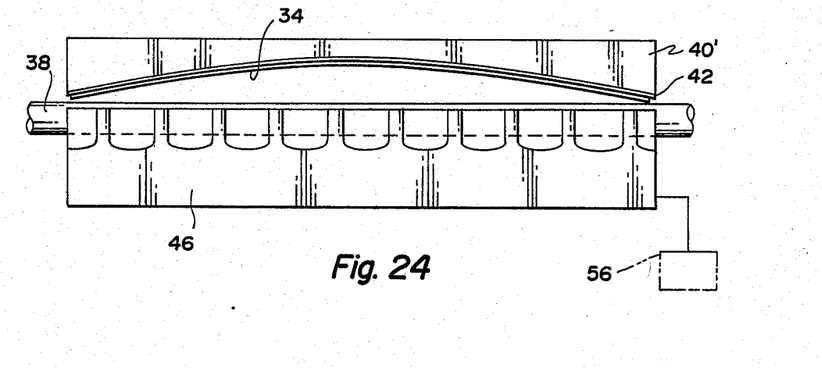
FIG. 24 is a partial sectional view taken along the direction of lines 24—24 in FIG. 22 showing the glass sheet engaged with the fixed mold.
Figure 25:
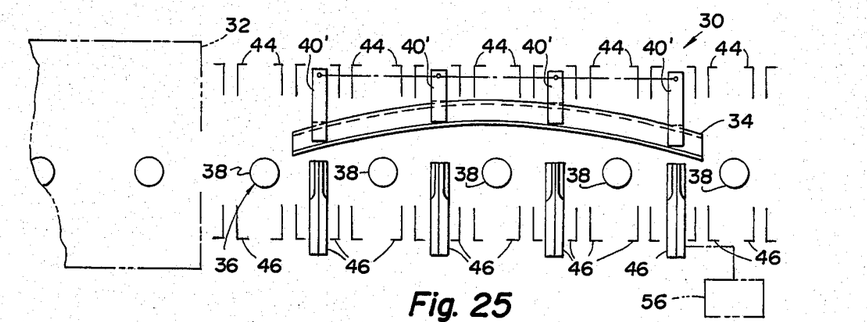
FIG. 25 is another elevational view of the roller conveyor shown in FIG. 23 illustrating the glass sheet engaged with the fixed molds.

FIGS. 20 through 28 illustrate a third embodiment of the combined bending and quench station 30 having molds with no moving parts. In it, the molds 40' shown are vertically fixed above the roller conveyor 36. In one arrangement of this embodiment, shown in FIGS. 20, 21 and 22, the molds 40' have arcuate glass engagement surfaces 42 for bending the heated glass sheet 34 about the bending axis B extending substantially perpendicular to the rolls 38 best seen in FIGS. 21 and 22. Alternatively and as shown in FIGS. 23, 24 and 25 the arcuate glass engagement surfaces are positioned to define a curve longitudinally along the direction of conveyance a of the glass sheet 34 along the roller conveyor 36. The combination of the arcuate glass engagement surfaces and the curve defining positioning along the roller conveyor 36 provide that the heated glass sheet 34 can be bent in a complex fashion.

Figure 26:
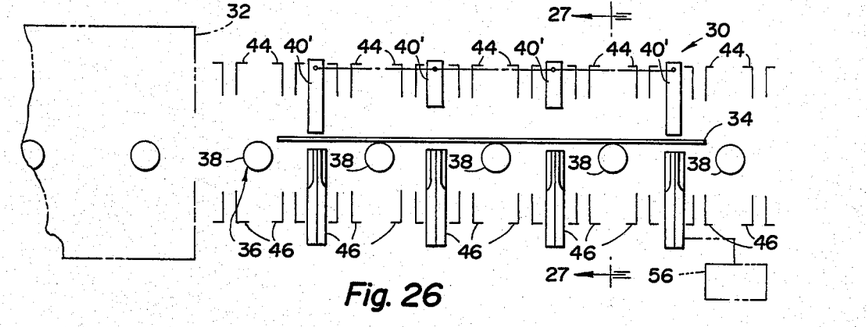
FIG. 26 is an elevational view of the bending and quench station shown in FIG. 20 illustrating the fixed molds having planar glass engagement surfaces.
Figure 27:
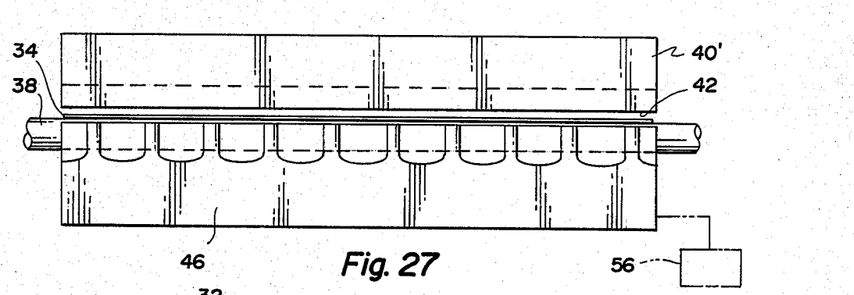
FIG. 27 is a partial sectional view taken along the direction of lines 27—27 in FIG. 26 illustrating the molds having the planar glass engagement surface.
Figure 28:
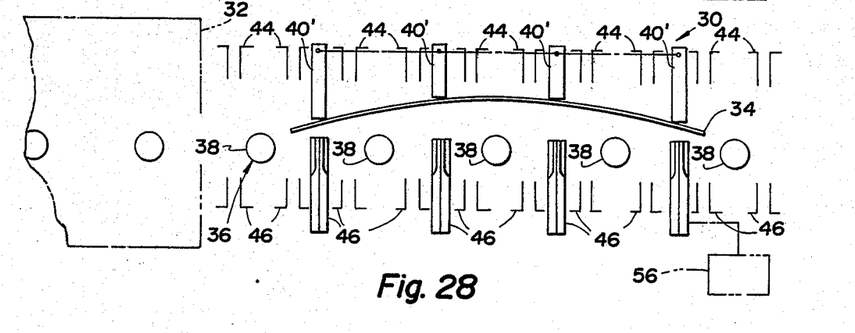
FIG. 28 is another elevational view of the bending and quench station shown in FIG. 26 illustrating the glass sheet engaged with the fixed molds.

In yet another arrangement of the embodiment shown in FIGS. 26, 27, and 28, the molds 40' have planar glass engagement surfaces 42 defining a curve longitudinally along the direction of conveyance a for bending the heated glass sheet 34 about the bending axis b which extends substantially perpendicular to the direction of conveyance a.

In this third embodiment, the heated glass sheet 34 exits the glass heating furnace 32 and is positioned about the roller conveyor 36 below the molds 40'. A control 56 sequentially regulates the air flow to the upper and lower blastheads 44,46 whereby the lower blastheads blow the heated flat glass sheet 34 off the rolls 38 and against the glass engagement surfaces 42 of the molds 40' to bend the glass sheet, the glass sheet forming to the shape defined by the glass engagement surfaces. After the glass sheet 34 is bent, both upper and lower blastheads 44,46 supply quenching gas that impinges with and hardens the bent glass sheet 34 while engaged with the molds 40' to initiate tempering of the bent glass sheet. The bent glass sheet 34 is subsequently lowered back onto the roller conveyor 36 by the regulation of air flow between upper and lower blastheads 44, 46 for further quenching and processing and/or shipping.

In operation, the steps of bending and quenching are quite short. The immediate application of quench air solidifies the bent glass 34 and initiates tempering. However, most of the tempering is accomplished after the glass 34 is again being conveyed on the rolls 38. With thin glass 34, it may be necessary to add heat to the quench to reduce cooling of the glass before tempering for successfully tempering glass less than one-eight of an inch thick.

While the best mode for carrying out the invention has been described in detail, those familiar with the art to which this invention relates will recognize various alternative designs and embodiments for practicing the invention as defined by the following claims.

What is claimed is:

1. A combined bending and quench station for bending and quenching heated flat glass sheets received from a glass heating furnace, the station comprising: a roller conveyor proximate the glass heating furnace; said roller conveyor including elongated rolls spaced from each other in a parallel relationship and rotatably supported to receive a heated flat glass sheet to be bent; a plurality of molds being located generally between the rolls; each mold having a glass engagement surface for engaging the heated glass sheet to provide bending thereof above the conveyor; means for engaging the glass engagement surfaces of the molds with the hot glass sheet; and an upper blasthead mounted above the roller conveyor and a lower blasthead mounted below the roller conveyor, said upper and lower blastheads cooperatively supplying quenching gas that impinges with the bent glass sheet while engaged with the molds to fix the shape and provide tempering of the bent glass sheet.

2. A combined bending and quench station as in claim 1 further including heaters mounted above the roller conveyor for providing heat to the glass sheet to thereby facilitate the bending of the heated glass sheet.

3. A combined bending and quench station as in claim 2 wherein the molds define movable molds; said movable molds being vertically movable intermediate the conveyor rolls between raised and lowered positions to allow conveyance of the glass sheet on the rolls in a direction of conveyance when the molds are in the lowered position and for bending the heated glass sheet about a bending axis in the raised position of the molds and thereafter lowering the molds to place the glass sheet back on the roller conveyor.

4. A combined bending and quench station as in claim 3 wherein the molds have arcuate glass engagement surfaces for bending the heated flat glass sheet with the bending axis substantially parallel to the direction of conveyance.

5. A combined bending and quench station as in claim 4 wherein the arcuate glass engagement surfaces define a curve longitudinally along the direction of conveyance for complex bending of the heated flat glass sheet.

6. A combined bending and quench station as in claim 3 wherein the molds have planar glass engagement surfaces.

7. A combined bending and quench station as in claim 6 wherein the glass engaging surfaces of the molds define a curve longitudinally along the direction of conveyance for bending the heated flat glass sheet with the bending axis extending substantially perpendicular to the direction of conveyance.

8. A combined bending and quench station as in claim 4, 5, or 6 wherein the means includes an actuator being operable to move the molds to the raised position above the roller conveyor whereby the heated flat glass sheet is sag bent to the shape defined by the glass engagement surfaces of the molds; the actuator being also operable for returning the molds to the lowered position.

9. A combined bending and quench station as in claim 8 further including a plurality of spaced upper molds fixedly mounted above the roller conveyor; said upper molds also having glass engagement surfaces that correspond to the glass engagement surfaces of the movable molds.

10. A combined bending and quench station as in claim 9 wherein the upper molds are aligned with the movable molds for cooperative operation to press bend the heated flat glass sheet against the upper molds in the raised position of the movable molds.

11. A combined bending and quench station as in claim 2 wherein the molds define fixed molds; said fixed molds being vertically fixed above the roller conveyor.

12. A combined bending and quench station as in claim 11 wherein the fixed molds have arcuate glass engagement surfaces for bending the heated glass sheet about a bending axis being substantially parallel to the direction of conveyance.

13. A combined bending and quench station as in claim 12 wherein the arcuate glass engagement surfaces define a curve longitudinally along the direction of conveyance for complex bending of the heated flat glass sheet.

14. A combined bending and quench station as in claim 11 wherein the fixed molds have planar glass engagement surfaces.

15. A combined bending and quench station as in claim 14 wherein the glass engaging surfaces of the fixed molds define a curve longitudinally along the direction of conveyance for bending the heated glass sheet with the bending axis substantially perpendicular to the direction of conveyance.

16. A combined bending and quench station as in claim 12, 13 or 15 wherein the means comprises a control for sequentially regulating the air flow to the blastheads whereby the lower blastheads blow the heated flat glass sheet against the glass engagement surfaces of the fixed molds to bend the glass sheet, and both upper and lower blastheads supply the quenching gas.

17. A combined bending and quench station for bending and quenching heated flat glass sheets heated in a glass heating furnace, the station comprising: a roller conveyor proximate the glass heating furnace; said roller conveyor including elongated rolls spaced from each other in a parallel relationship and rotatably supported to receive a heated flat glass sheet to be bent; a plurality of molds being located generally between the rolls; each mold having an arcuate glass engagement surface; the molds being vertically movable intermediate the conveyor rolls between raised and lowered positions; an actuator being operable to move the molds to allow conveyance of the glass sheet on the rolls in a direction of conveyance when the molds are in the lowered position and for sag bending the glass sheet about a bending axis extending substantially parallel to the direction of conveyance in the raised position of the molds and returning the molds to the lowered position; and an upper blasthead mounted above the roller conveyor and a lower blasthead mounted below the roller conveyor, said upper and lower blastheads cooperatively supplying quenching gas that impinges with the bent glass sheet while engaged with the molds to provide hardening, fix the shape and initiate tempering of the bent glass sheet.

18. A combined bending and quench station for bending and quenching heated flat glass sheets heated in a glass heating furnace, the station comprising: a roller conveyor proximate the glass heating furnace; said roller conveyor including elongated rolls spaced from each other in a parallel relationship and rotatably supported to receive a heated flat glass sheet to be bent; a plurality of molds being located generally between the rolls; each mold having an arcuate glass engagement surface; the molds being vertically movable intermediate the conveyor rolls between raised and lowered positions; an actuator being operable to move the molds to allow conveyance of the glass sheet on the rolls in a direction of conveyance when the molds are in the lowered position and for sag bending the glass sheet in the raised position of the molds and returning the molds to the lowered position; said surfaces of the molds defining a curve longitudinally along the direction of conveyance for complex bending of the heated flat glass sheet; and an upper blasthead mounted above the roller conveyor and a lower blasthead mounted below the roller conveyor, said upper and lower blastheads cooperatively supplying quenching gas that impinges with the bent glass sheet while engaged with the molds to provide hardening, fix the shape and initiate tempering of the bent glass sheet.

19. A combined bending and quench station for bending and quenching heated flat glass sheets heated in a glass heating furnace, the station comprising: a roller conveyor proximate the glass heating furnace; said roller conveyor including elongated rolls spaced from each other in a parallel relationship and rotatably supported to receive a heated flat glass sheet to be bent; a plurality of molds being located generally between the rolls; each mold having a planar glass engagement surface; the molds being vertically movable intermediate the conveyor rolls between raised and lowered positions; an actuator being operable to move the molds to allow conveyance of the glass sheet on the rolls in a direction of conveyance when the molds are in the lowered position and for sag bending the glass sheet about a bending axis in the raised position of the molds and returning the molds to the lowered position; said surfaces of the molds defining a curve longitudinally along the direction of conveyance for bending the heated flat glass sheet with the bending axis substantially perpendicular to the direction of conveyance; and an upper blasthead mounted above the roller conveyor and a lower blasthead mounted below the roller conveyor, said upper and lower blastheads cooperatively supplying quenching gas that impinges with the bent glass sheet while engaged with the molds to provide hardening, fix the shape and initiate tempering of the bent glass sheet.

20. A combined bending and quench station for bending and quenching heated flat glass sheets heated in a glass heating furnace, the station comprising: a roller conveyor proximate the glass heating furnace; said roller conveyor including elongated rolls spaced from each other in a parallel relationship and rotatably supported to receive a heated flat glass sheet to be bent; a plurality of molds being located generally between the rolls; the molds defining movable molds and upper molds in opposed relation; each mold having an arcuate glass engagement surface; the movable molds being vertically movable intermediate the conveyor rolls between raised and lowered positions; the upper molds being fixedly mounted above the roller conveyor and aligned with the movable molds; an actuator being operable to move the movable molds to allow conveyance of the glass sheet on the rolls in a direction of conveyance when the movable molds are in the lowered position and for press bending the glass sheet against the upper molds about a bending axis extending substantially parallel to the direction of conveyance in the raised position of the movable molds and returning the molds to the lowered position; and an upper blasthead mounted above the roller conveyor and a lower blasthead mounted below the roller conveyor, said upper and lower blastheads cooperatively supplying quenching gas that impinges with the bent glass sheet while engaged with the molds to provide hardening, fix the shape and initiate tempering of the bent glass sheet.

21. A combined bending and quench station for bending and quenching heated flat glass sheets heated in a glass heating furnace, the station comprising: a roller conveyor proximate the glass heating furnace; said roller conveyor including elongated rolls spaced from each other in a parallel relationship and rotatably supported to receive a heated flat glass sheet to be bent; a plurality of molds being located generally between the rolls; the molds defining movable molds and upper molds in opposed relation; each mold having an arcuate glass engagement surface; the movable molds being vertically movable intermediate the conveyor rolls between raised and lowered positions; the upper molds being fixedly mounted above the roller conveyor and aligned with the movable molds; an actuator being operable to move the movable molds to allow conveyance of the glass sheet on the rolls in a direction of conveyance when the movable molds are in the lowered position and for press bending the glass sheet against the upper molds in the raised position and returning the molds to the lowered position; said surfaces of the molds defining a curve longitudinally along the direction of conveyance for complex bending of the heated flat glass sheet; and an upper blasthead mounted above the roller conveyor and a lower blasthead mounted below the roller conveyor, said upper and lower blastheads cooperatively supplying quenching gas that impinges with the bent glass sheet while engaged with the molds to provide hardening, fix the shape and initiate tempering of the bent glass sheet.

22. A combined bending and quench station for bending and quenching heated flat glass sheets heated in a glass heating furnace, the station comprising: a roller conveyor proximate the glass heating furnace; said roller conveyor including elongated rolls spaced from each other in a parallel relationship and rotatably supported to receive a heated flat glass sheet to be bent; a plurality of molds being located generally between the rolls; the molds defining movable molds and upper molds in opposed relation; each mold having a planar glass engagement surface; the movable molds being vertically movable intermediate the conveyor rolls between raised and lowered positions; the upper molds being fixedly mounted above the roller conveyor and aligned with the movable molds; an actuator being operable to move the movable molds to allow conveyance of the glass sheet on the rolls in a direction of conveyance when the movable molds are in the lowered position and for press bending the glass sheet against the upper molds about a bending axis and returning the molds to the lowered position; said surfaces of the molds defining a curve longitudinally along the direction of conveyance for bending the heated flat glass sheet with the bending axis substantially perpendicular to the direction of conveyance in the raised position of the movable molds; and an upper blasthead mounted above the roller conveyor and a lower blasthead mounted below the roller conveyor, said upper and lower blastheads cooperatively supplying quenching gas that impinges with the bent glass sheet while engaged with the molds to provide hardening, fix the shape and initiate tempering of the bent glass sheet.

23. A combined bending and quench station for bending and quenching heated flat glass sheets heated in a glass heating furnace, the station comprising: a roller conveyor proximate the glass heating furnace; said roller conveyor including elongated rolls spaced from each other in a parallel relationship and rotatably supported to receive and convey a heated flat glass sheet to be bent; a plurality of molds being located generally between the rolls fixedly mounted above the roller conveyor; each mold having an arcuate glass engagement surface; an upper blasthead mounted above the roller conveyor and a lower blasthead mounted below the roller conveyor, said upper and lower blastheads cooperatively supplying quenching gas; and a control for sequentially regulating air flow to the blastheads whereby the lower blastheads blow the heated glass sheet against the glass engagement surfaces of the molds to bend the glass sheet about a bending axis extending substantially perpendicular to the rolls of the roller conveyor, and both upper and lower blastheads supplying quenching gas that impinges with the bent glass sheet while engaged with the molds to provide hardening, fix the shape and initiate tempering of the bent glass sheet.

24. A combined bending and quench station for bending and quenching heated flat glass sheets heated in a glass heating furnace, the station comprising: a roller conveyor proximate the glass heating furnace; said roller conveyor including elongated rolls spaced from each other in a parallel relationship and rotatably supported to receive and convey a heated flat glass sheet to be bent; a plurality of molds being located generally between the rolls fixedly mounted above the roller conveyor; each mold having an arcuate glass engagement surface; the glass engaging surfaces defining a curve longitudinally along the direction of conveyance along the roller conveyor; an upper blasthead mounted above the roller conveyor and a lower blasthead mounted below the roller conveyor, said upper and lower blastheads cooperatively supplying quenching gas; and a control for sequentially regulating air flow to the blastheads whereby the lower blastheads blow the heated glass sheet against the glass engagement surfaces of the molds to bend the glass sheet in a complex fashion, and both upper and lower blastheads supplying quenching gas that impinges with the bent glass sheet while engaged with the molds to provide hardening, fix the shape and initiate tempering of the bent glass sheet.

25. A combined bending and quench station for bending and quenching heated flat glass sheets heated in a glass heating furnace, the station comprising: a roller conveyor proximate the glass heating furnace; said roller conveyor including elongated rolls spaced from each other in a parallel relationship and rotatably supported to receive and convey a heated flat glass sheet to be bent; a plurality of molds being located generally between the rolls fixedly mounted above the roller conveyor; each mold having a planar glass engagement surface; the glass engaging surfaces defining a curve longitudinally along the direction of conveyance along the roller conveyor; an upper blasthead mounted above the roller conveyor and a lower blasthead mounted below the roller conveyor, said upper and lower blastheads cooperatively supplying quenching gas; and a control for sequentially regulating air flow to the blastheads whereby the lower blastheads blow the heated glass sheet against the glass engagement surfaces of the molds to bend the glass sheet about a bending axis extending substantially perpendicular to the direction of conveyance, and both upper and lower blastheads supplying quenching gas that impinges with the bent glass sheet while engaged with the molds to provide hardening, fix the shape and initiate tempering of the bent glass sheet.

* * * * *

UNITED STATES PATENT AND TRADEMARK OFFICE
CERTIFICATE OF CORRECTION

PATENT NO. : 4,784,681
DATED : November 15, 1988
INVENTOR(S) : Harold A. McMaster It is certified that error appears in the above-identified patent and that said Letters Patent is hereby corrected as shown below:

```
Column 5, line 20, after "conveyance" delete "a";
Column 5, line 34, after "axis" delete "b";
Column 5, line 36, after "conveyance" delete "a";
Column 5, line 38, after "conveyance" delete "a";
Column 5, line 46, after "conveyance" delete "a";
Column 5, line 47, after "axis" delete "b";
Column 5, line 48, after "conveyance" delete "a";
Column 6, line 49, before "of" delete "a";
Column 6, line 57, after "conveyance" delete "a";
Column 6, line 59, before "which" delete "b"; and
Column 6, line 60, after "conveyance" delete "a".
```

Signed and Sealed this

Fourth Day of July, 1989

Attest:

DONALD J. QUIGG

Attesting Officer

Commissioner of Patents and Trademarks